US008374340B2

United States Patent
Puech et al.

(10) Patent No.: US 8,374,340 B2
(45) Date of Patent: Feb. 12, 2013

(54) METHOD FOR SECURE TRANSMISSION OF DATA

(75) Inventors: William Puech, Nimes (FR); José Marconi Rodrigues, Avignon (FR)

(73) Assignees: Centre National de la Recherche Scientifique-CNRS, Paris (FR); Universite de Montepellier II, Montepellier (FR)

( * ) Notice: Subject to any disclaimer, the term of this patent is extended or adjusted under 35 U.S.C. 154(b) by 1301 days.

(21) Appl. No.: 12/091,039

(22) PCT Filed: Oct. 12, 2006

(86) PCT No.: PCT/FR2006/002303
§ 371 (c)(1),
(2), (4) Date: Apr. 21, 2008

(87) PCT Pub. No.: WO2007/045746
PCT Pub. Date: Apr. 26, 2007

(65) Prior Publication Data
US 2008/0226062 A1  Sep. 18, 2008

(30) Foreign Application Priority Data
Oct. 21, 2005  (FR) ...................................... 05 10787

(51) Int. Cl.
*H04L 9/28* (2006.01)
(52) U.S. Cl. ........................................................ 380/28
(58) Field of Classification Search ...................... 380/28
See application file for complete search history.

(56) References Cited

U.S. PATENT DOCUMENTS

| 2002/0071559 | A1* | 6/2002 | Christensen et al. | 380/277 |
| 2002/0114453 | A1* | 8/2002 | Bartholet et al. | 380/44 |
| 2004/0022391 | A1* | 2/2004 | O'Brien | 380/281 |
| 2004/0179685 | A1* | 9/2004 | Soliman | 380/44 |
| 2008/0107267 | A1 | 5/2008 | Joliot | |

FOREIGN PATENT DOCUMENTS

| FR | 2 868 226 | 9/2005 |
| WO | WO-2004/012378 A2 | 2/2004 |

OTHER PUBLICATIONS

International Search Report for PCT/FR2006/002303, mailed Feb. 2, 2007.

* cited by examiner

*Primary Examiner* — Krista Zele
*Assistant Examiner* — Esther Benoit
(74) *Attorney, Agent, or Firm* — Marshall, Gerstein & Borun LLP

(57) ABSTRACT

A system and method concerns a secure transmission of a file fragmentable into a plurality of fragments, and comprises (a) initially fixing a global encryption key; (b) encrypting the fragmentable file based on said global key to form a first encrypted file; (c) encrypting the global key by means of an asymmetric encryption algorithm using a public key to obtain a global encrypted key; (d) inserting values representing the global encrypted key among the fragments of said encrypted file to form a second encrypted file; and (e) transmitting the second encrypted file.

14 Claims, 2 Drawing Sheets

FIG.1.
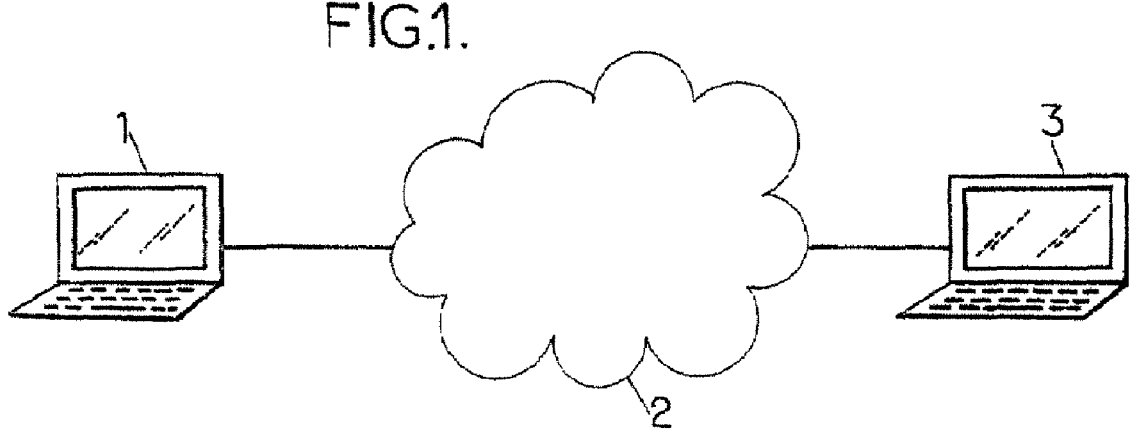
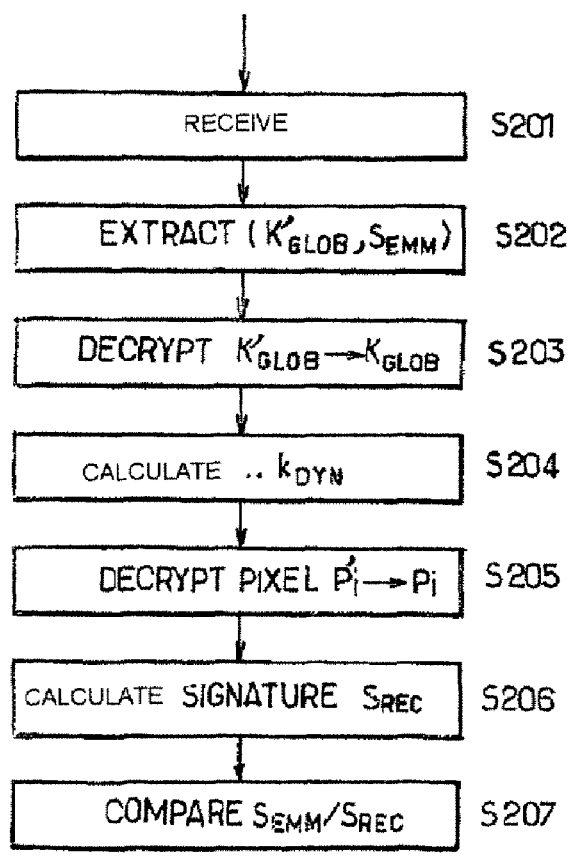
FIG.3.

METHOD FOR SECURE TRANSMISSION OF DATA

FIELD OF THE INVENTION

The invention relates to methods for secure transmission of data and to devices implementing this type of method, in particular adapted for transmitting fragmentable data files of significant size.

BACKGROUND OF THE INVENTION

In order to transmit files of significant size, such as images, in a secure manner, it is possible to use symmetric encipherment systems. However, this type of encipherment necessitates the dispatching of a secret key used to decrypt and encrypt the file transmitted. Consequently, such a method of transmitting secure data comprises the risk of the interception of the key which may make it possible to decrypt the data file. Moreover, the receiver will then know the key used by the sender, this therefore necessitating regular, indeed systematic, changing of the secret key to be used.

Additionally, it is very unwieldy to use an asymmetric encryption system which therefore implements a private key to encrypt each file fragment by the sender and a public key transferred to the receiver to decrypt this fragment. Specifically, on account of the receiver's partial knowledge of the key, asymmetric systems necessitate the use of large prime integers, of significant size, in particular greater than 1024 bits (in particular in the RSA algorithm) to encrypt each file fragment. Consequently, the resources and time required to implement such a method of encrypted transmission are significant.

An aim of the present invention is to alleviate these drawbacks.

The present invention proposes a method for secure transmission of data allowing the dispatching of data of significant size, in particular of images, and which is fast and effective.

Additionally, the aim of the present invention is to provide a method for secure data transmission that is robust to noise or to the loss of data, in particular by fraudulent interception of data packets.

SUMMARY OF THE INVENTION

For this purpose, the invention proposes a method for secure transmission of a file fragmentable into a plurality of fragments in which, (a) a global encipherment key is fixed initially,
(b) the fragmentable file is enciphered as a function of said global key to form a first encrypted file;
(c) the global key is enciphered by means of an asymmetric encipherment algorithm to obtain an enciphered global key,
(d) values representative of the enciphered global key are inserted among the fragments of said encrypted file to form a second encrypted file, and;
(e) said second encrypted file is transmitted.

By thus inserting in an encrypted manner the global key into the file to be transferred, the receiver can thus decrypt the global key advantageously by means of a public key of an asymmetric algorithm. The global key being of reduced size, the decryption of this global key is easily achievable. Thereafter, the encryption of the file can use an encipherment algorithm that is less unwieldy to implement, and using this global key which will be enciphered and then inserted into the file, thereby ensuring a shorter encryption/decryption time.

A substantially similar chain of steps is known from the document WO04/012378. However, the present invention goes further and proposes a particularly advantageous characteristic according to which, in step (b), for a succession of fragments:

(b1) each current fragment is assigned a dynamic encryption key determined on the basis of a combination involving a group of previously encrypted fragments, and
(b2) the value of the current fragment is allocated a value which is dependent on its initial value and on said dynamic key.

This type of encipherment allows fast encryption of the data of the fragmentable file and makes it possible to solve all the integrity problems. Specifically, if a data packet is lost, the whole of the encrypted file will be modified thereby. Additionally, this type of encryption makes it possible to begin decryption, on receipt, before having received the entirety of the encrypted file. This type of encryption is therefore particularly adapted for transmitting big files across a network such as the Internet.

In an embodiment of the invention, a value representative of a signature of the fragmentable file is inserted, in addition to the values representative of the global key enciphered in the encrypted file. This signature makes it possible to verify, on receipt, that the transmitted image has been correctly decrypted, and in particular to verify the integrity of this image. Specifically, interception of data during transmission would generate a shift such that the image once decrypted, would no longer correspond to the signature inserted into the image.

In an advantageous realization also, a linear combination of the values of the previously encrypted fragments is used by implementing coefficients $\alpha_j$, dependent on the global key, and in which the coefficients $\alpha_j$ are expressed by the relation:

$$\begin{cases} \alpha_j = \beta_j - 2^{l-1} - 1 & \text{if } \beta_j \in \{0, \ldots, 2^l - 2\}, \\ \alpha_j = \pm 2^{l-1} & \text{if } \beta_j = 2^l - 1, \end{cases}$$

with $$\beta_j = \sum_{n=1}^{l} 2^{l-n} b_{lj-l+n}.$$

where $b_{lj-l+n}$ are l successive values of the global key.

This relation makes it possible to choose the $\alpha_j$ so that the sum of these coefficients is very close to zero. Thus, as the insertion of data is performed in the file, noise (vagaries) is also inserted. The fact of choosing the $\alpha_j$ so that their sum is about equal to zero makes it possible to attenuate the noise during the decryption phase. The $\alpha_j$ are therefore chosen so that the probability density of appearance of each value is nearly uniform.

Thereafter, the invention proposes a method for secure reception of an encrypted file fragmentable into a plurality of fragments, in which:

a') the encrypted file is received,
b') values representative of an enciphered global key are extracted from among the fragments of said encrypted file,
c') the enciphered global key is deciphered using a public key to obtain a deciphered global key,
d') the encrypted fragmentable file is deciphered as a function of said deciphered global key.

According to an advantageous general characteristic of the invention, on receipt, and more particularly in step b'), a dynamic encryption key specific to each current fragment is determined on the basis of a combination involving a group of previously decrypted fragments.

Additionally, the invention proposes a send/receive system implementing a method for the secure transmission of a fragmentable file in accordance with the invention.

Moreover, the invention also proposes a computer program product whose installation on a computer allows the execution of the method for secure transmission in accordance with the invention and/or the method of reception in accordance with the invention.

Other features and advantages of the present invention will appear in the description hereinafter of a nonlimiting exemplary embodiment, with reference to the appended drawings, in which:

BRIEF DESCRIPTION OF THE DRAWINGS

FIG. 1 represents a network in which the method of the invention is implemented;

FIG. 3 is a flowchart representing a method of reception in accordance with the invention.

DETAILED DESCRIPTION OF THE PREFERRED EMBODIMENTS

Figure 2:
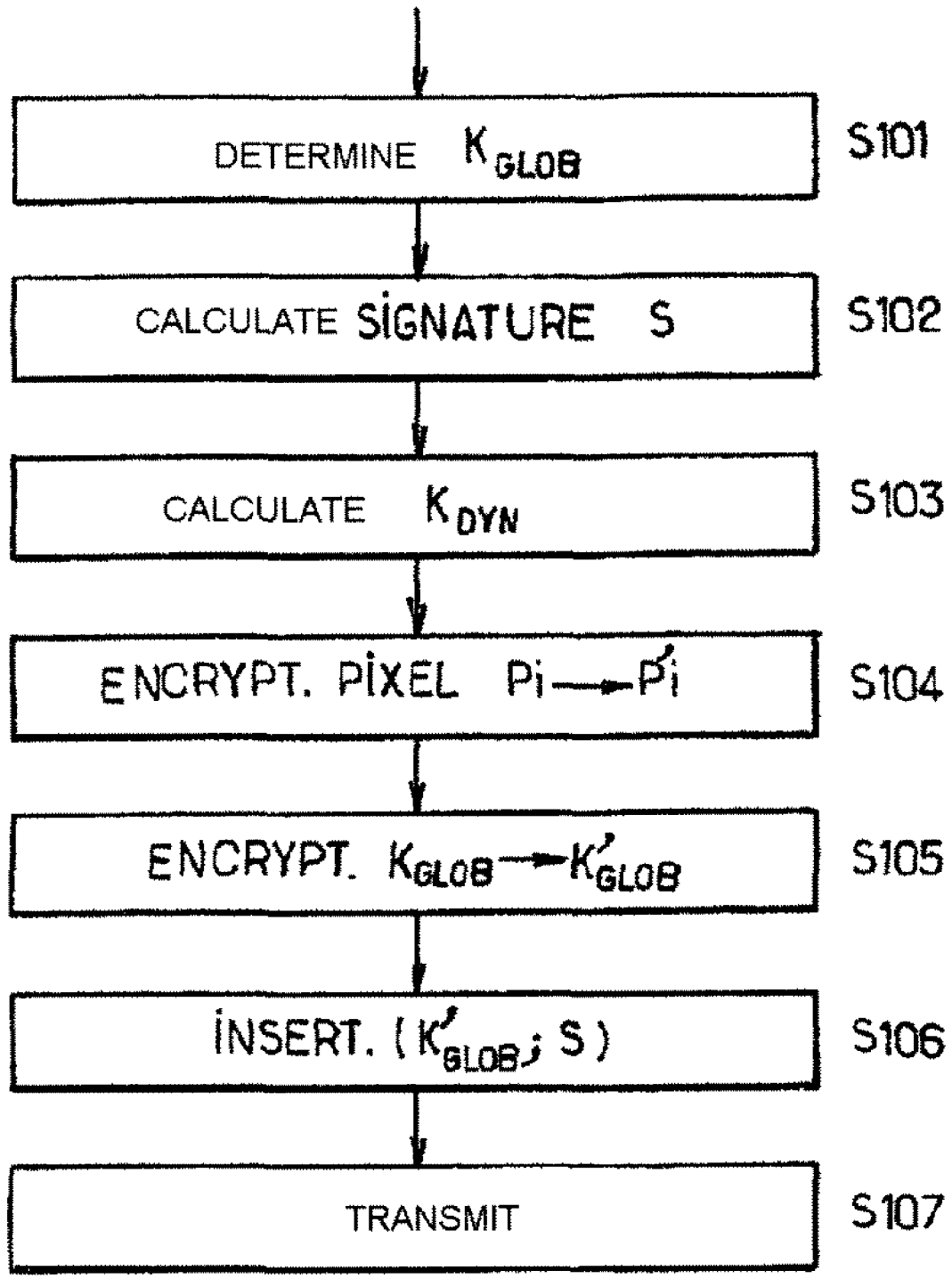
FIG. 2 is a flowchart representing a method for secure transmission in accordance with the invention.

FIG. 1 represents a first terminal 1 linked to a computer-based network 2, for example the Internet. The first terminal 1 is adapted for transmitting data via the network 2 to a second terminal 3.

In order to securely transmit a data file of significant size, such as for example an image, across the computer-based network 2, the invention proposes a method illustrated in particular by the example of FIG. 2. In step S101, and according to the method in accordance with the invention, a global encryption key $K_{glob}$ is determined. This key is formed for example of kbits divided into Twords where T=k/l, l being the length of each of the points.

This global key can be used so as to perform flow-based encryption, as described hereinafter. However, this global key can be a secret key for a symmetric block encryption algorithm, or any other type of encryption algorithm.

This key can be stored in the encryption system which will perform the encryption and the transmission of the encrypted file, or can also be generated by an encryption keys generator.

In step S102, it is possible to calculate a signature S of the image which can also be transmitted with the encrypted file. This signature makes it possible in particular to verify the integrity of the file upon receipt so as to check that no interception or loss of packet has been caused by the transmission. Consequently, this signature S makes it possible to strengthen the security of the image. Specifically, within the framework of the application to the transfer of medical images for example between a medical imaging laboratory and the doctor who must analyze the images obtained, it is important to ensure that no datum has been added or modified in the transferred image. The signature makes it possible to perform a comparison between the image received and the image transmitted.

Thereafter, the method can implement a flow-based encryption algorithm which is in particular suited to file transmission across a network as in the example represented. Specifically, this type of encryption makes it possible in particular to begin the decipherment of the encrypted data even before the file is fully received. However, another encryption method could be used, for example a secret-key block encryption, where the secret key would be the global key $K_{glob}$. Nevertheless, the flow-based encipherment algorithm presents various advantages with respect to the block algorithm. First of all, in contradistinction to the block algorithm, the flow-based algorithm is less sensitive to noise. Thereafter, the integrity of the images is improved. Furthermore, the flow-based algorithm does not cause textured zones to appear when the unencrypted image exhibits homogeneous zones. In accordance with step S103, for each fragment of the file to be encrypted, for example for each pixel or group of pixels, $p_i$ of the image, a dynamic key $k_{dyn}$ is calculated, within the framework of the flow-based encipherment algorithm. This flow-based encipherment can be termed synchronous or asynchronous. In the case of synchronous flow-based encipherment, the dynamic key $k_{dyn}$ does not depend on the data to be encrypted or on the data that has been encrypted. Conversely, in the case of asynchronous encipherment, the dynamic key which is established as a function of the previously encrypted pixels. This dynamic key can for example be obtained by means of various key generating functions and, as in the preferred embodiment of the invention, by means of a linear combination, as indicated by the following formula:

$$\begin{cases} z_i = \left( \sum_{j=1}^{n} \alpha_j p'_{i-j} \right) \mod X \\ p'_i = (z_i + p_i) \mod X \end{cases}$$

where:

$z_i$ is the dynamic key value assigned to the current pixel or fragment of value $p_i$, i varying between 1 and n, where n is the number of pixels or fragments, $\alpha_j$ with j lying between 1 and n is a set of coefficients for implementing the linear combination applied to the current pixel or fragment, $p'_{i-j}$ with i-j lying between i-n and i-1 is a set of values of n previously encrypted pixels, $p'_i$ is the value of the encrypted current pixel, and mod X corresponds to a congruence specific to a sampling of said fragments.

In this example, X depends on the size of the memory allocated to the calculation of the encrypted values of the current pixel. In general, X equals 256 points. Each pixel $p_i$ is therefore encrypted into pixel $p_i'$ in step S104. Additionally the coefficients $\alpha_j$ of the linear combination are obtained on the basis of the global key $K_{glob}$. An exemplary embodiment is illustrated by the following formula:

$$\begin{cases} \alpha_j = \beta_j - 2^{l-1} - 1 & \text{if } \beta_j \in \{0, \ldots, 2^l - 2\}, \\ a_j = \pm 2^{l-1} & \text{if } \beta_j = 2^l - 1, \end{cases}$$

with $$\beta_j = \sum_{n=1}^{l} 2^{l-n} b_{lj-l+n}.$$

where blj−l+n are l successive values of the global key.

In this case, the global key $K_{glob}$ is formed of n words of a length of l bits, each bit being denoted $b_j$. By using such a formula, it is possible to alter the coefficients $\alpha_j$, in particular so that the sum of all the $\alpha_j$ is about zero. This makes it possible in particular to decrease the influence of the noise of the decryption algorithm in accordance with the invention.

When the whole of the file has been encrypted, the global key $K_{glob}$ is in its turn encrypted, for example by an asymmetric encipherment algorithm with a public key and a private key. It is possible to use such an encipherment algorithm for this case, since the global key is not a file of too significant a size.

Once enciphered in step S105, the enciphered global key $K'_{glob}$ is thereafter inserted into the encrypted file (S106). The signature can also be encrypted in the course of this same step. The insertion of the data can be done in various ways as a function of the length of the message to be inserted and of the desired robustness. For the insertion of data filed in images, there are two principal groups of procedures: procedures which work in the spatial domain, and procedures which work in the frequency domain, in particular with the DCT (Discrete Cosine Transform). The combination in the spatial and frequency domain is also possible. It is possible to use a combination which directly embeds the data in the pixels of the image, in particular by using for example pseudo-random number generators to choose the sequence of pixels affected by the insertion. However, the procedure preferred in the invention uses an algorithm which embeds the information in the low-order bits of the image. The objective is to embed in the image an n-bits message composed of the encrypted secret key and of the signature of the original image. It is then necessary to calculate an insertion factor so as to disperse the message throughout the image. This dispersion makes it possible to attenuate the noise to the insertion of data and also makes it possible to extend the visual integrity of the image to the whole image. The image is therefore divided into n regions of equivalent size, each of these regions will be used to embed a bit of the message. The recurrence of the algorithm for the insertion will have to be at least equal to the size of these regions by insertion of hidden data.

Once all the data have been inserted into the file, the file thus encrypted is transmitted in step S107 to a recipient, for example the second terminal 3 of FIG. 1.

Thereafter, the recipient can decrypt the image using an inverse decipherment method illustrated by FIG. 3, that is to say beginning by extracting from the image received in stage S201, the encrypted global key as well as the signature $S_{EMM}$ (S202). Next, the user can decrypt this global key by means of a public key which, for example, has been transmitted to him by the sender beforehand (S203), and decrypt the whole of the image by means of this decrypted global key in a manner analogous to the encryption algorithm used, in steps S204 and S205. Finally, the signature $S_{MEC}$ of the decrypted received image is calculated in step S206, then, in step S207, the signature of the original image $S_{EMM}$ is compared with the signature of the image received $S_{REC}$, so as to verify the integrity of the image, and to determine whether the transmitted data have undergone an attack during transmission.

Of course, the invention is not limited to the embodiment described above by way of example; it applies to other variants.

Thus, according to an advantageous realization, it is furthermore possible to compress the data file in the course of encryption.

The invention claimed is:

1. A method for secure transmission of a file fragmentable into a plurality of fragments, where a processor performs the method in which:
   (a) a global encipherment key is fixed initially;
   (b) the fragmentable file is enciphered as a function of said global key to form a first encrypted file;
   (c) the global key is enciphered by the processor using an asymmetric encipherment algorithm to obtain an enciphered global key;
   (d) values representative of the enciphered global key are inserted among the fragments of said encrypted file to form a second encrypted file; and
   (e) said second encrypted file is transmitted, wherein, in step (b), for a succession of fragments:
   (b1) each current fragment is assigned a dynamic encryption key determined on the basis of a combination involving a group of previously encrypted fragments, wherein a linear combination is applied to the values of the previously encrypted fragments by the processor, the linear combination expressed by:

$$\begin{cases} z_i = \left( \sum_{j=1}^{n} \alpha_j p'_{i-j} \right) \bmod X \\ p'_i = (z_i + p_i) \bmod X \end{cases}$$

where:
   $z_i$ is the dynamic key value assigned to the current fragment of value $p_i$,
   $\alpha_j$ with j lying between 1 and n is a set of coefficients for implementing the linear combination applied to the current fragment,
   $p'_{i-j}$ with i-j lying between i-n and i-1 is a set of values of n previously encrypted fragments,
   $p'_i$ is the value of the encrypted current fragment, and
   mod X corresponds to a congruence specific to a sampling of said fragments; and
   (b2) the value of the current fragment is allocated a value which is dependent on its initial value and on said dynamic key.

2. The method as claimed in claim 1, according to which in step (d), a value representative of a signature of the fragmentable file is moreover inserted.

3. The method as claimed in claim 1, wherein said linear combination involves coefficients (a) which are expressed as a function of the global key.

4. The method as claimed in claim 1, wherein said linear combination involves coefficients whose sum is minimal in absolute value.

5. The method as claimed in claim 1, wherein the global key comprises a succession of a first number of values,
   and the linear combination involves a second number of previously encrypted fragments, the first number being a multiple of the second number.

6. The method as claimed in claim 5, wherein said linear combination involves coefficients whose sum is minimal in absolute value, and the coefficients $\alpha_j$ are expressed by the relation:

$$\begin{cases} \alpha_j = \beta_j - 2^{l-1} - 1 & \text{if } \beta_j \in \{0, \ldots, 2^l - 2\}, \\ \alpha_j = \pm 2^{l-1} & \text{if } \beta_j = 2^l - 1, \end{cases}$$

with $$\beta_j = \sum_{n=1}^{l} 2^{l-n} b_{lj-l+n.}$$

where are $b_{lj-l+n}$ successive values of the global key.

7. The method as claimed in claim 5, wherein the first number is twice the second number.

8. The method as claimed in claim 1, wherein said successive values of the global key are inserted into respective blocks of encrypted fragments, of the same dimensions.

9. The method as claimed in claim 1, wherein said file consists of samples and each fragment is a sample or a block of samples.

10. The method as claimed in claim 9, wherein the samples are pixels or voxels or temporal pixels.

11. A method for secure reception of an encrypted file fragmentable into a plurality of fragments, where a processor performs the method in which:
   a') the encrypted file is received;
   b') values representative of an enciphered global key are extracted from among the fragments of said encrypted file;
   c') the enciphered global key is deciphered using a public key to obtain a deciphered global key;

d') the encrypted fragmentable file is deciphered as a function of said deciphered global key, wherein in step b'), a dynamic encryption key specific to each current fragment is determined by the processor on the basis of a linear combination involving a group of previously decrypted fragments, the linear combination expressed by:

$$\begin{cases} z_i = \left(\sum_{j=1}^{n} \alpha_j p'_{i-j}\right) \bmod X \\ p'_i = (z_i + p_i) \bmod X \end{cases}$$

where:
- $z_i$ is the dynamic key value assigned to the current fragment of value $p_i$,
- $\alpha_j$ with j lying between 1 and n is a set of coefficients for implementing the linear combination applied to the current fragment,
- $p'_{i-j}$ with i-j lying between i-n and i-1 is a set of values of n previously encrypted fragments,
- $p'_i$ is the value of the encrypted current fragment, and
- mod X corresponds to a congruence specific to a sampling of said fragments.

12. The method as claimed in claim 11, wherein the decrypted file is verified by means of a signature inserted with the enciphered global key.

13. A send/receive system comprising:
an encryption system embodied as a set of machine-executable instructions stored on a computer readable storage memory, the instructions executed by a processor, the encryption system configured to:
(a) fix a global encipherment key;
(b) encipher a fragmentable file as a function of said global key to form a first encrypted file;
(c) encipher the global key by means of an asymmetric encipherment algorithm to obtain an enciphered global key,
(d) insert values representative of the enciphered global key are inserted among the fragments of said encrypted file to form a second encrypted file; and
(e) transmit said second encrypted file for a succession of fragments:
(b1) assign each current fragment a dynamic encryption key determined on the basis of a combination involving a group of previously encrypted fragments, wherein a linear combination is applied to the values of the previously encrypted fragments, the linear combination expressed by:

$$\begin{cases} z_i = \left(\sum_{j=1}^{n} \alpha_j p'_{i-j}\right) \bmod X \\ p'_i = (z_i + p_i) \bmod X \end{cases}$$

where:
- $z_i$ is the dynamic key value assigned to the current fragment of value $p_i$,
- $\alpha_j$ with j lying between 1 and n is a set of coefficients for implementing the linear combination applied to the current fragment,
- $p'_{i-j}$ with i-j lying between i-n and i-1 is a set of values of n previously encrypted fragments,
- $p'_i$ is the value of the encrypted current fragment, and
- mod X corresponds to a congruence specific to a sampling of said fragments.

(b2) allocate the value of the current fragment depending on its initial value and on said dynamic key.

14. A computer system for secure transmission of a file fragmentable into a plurality of fragments, comprising:
a processor;
a computer readable memory;
programming instructions stored on the computer readable memory and executed by the processor to:
initially fix a global encipherment key;
encipher the fragmentable file as a function of said global key to form a first encrypted file;
encipher the global key including an asymmetric encipherment algorithm to obtain an enciphered global key;
insert values representative of the enciphered global key among the fragments of said encrypted file to form a second encrypted file;
transmit said second encrypted file; and wherein for a succession of fragments,
assign a dynamic encryption key to each current fragment determined on the of a combination involving a group of previously encrypted fragments, wherein a linear combination is applied by the processor to the values of the previously encrypted fragments, the linear combination expressed by:

$$\begin{cases} z_i = \left(\sum_{j=1}^{n} \alpha_j p'_{i-j}\right) \bmod X \\ p'_i = (z_i + p_i) \bmod X \end{cases}$$

where:
- $z_i$ is the dynamic key value assigned to the current fragment of value $p_i$,
- $\alpha_j$ with j lying between 1 and n is a set of coefficients for implementing the linear combination applied to the current fragment,
- $p'_{i-j}$ with i-j lying between i-n and i-1 is a set of values of n previously encrypted fragments,
- $p'_i$ is the value of the encrypted current fragment, and
- mod X corresponds to a congruence specific to a sampling of said fragments; and allocate a value of the current fragment dependent on its initial value and on said dynamic key.

* * * * *

UNITED STATES PATENT AND TRADEMARK OFFICE
CERTIFICATE OF CORRECTION

PATENT NO.        : 8,374,340 B2
APPLICATION NO. : 12/091039
DATED             : February 12, 2013
INVENTOR(S)       : Puech et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1302 days.

Signed and Sealed this
First Day of September, 2015

Michelle K. Lee
*Director of the United States Patent and Trademark Office*